Aug. 9, 1960  V. M. OBENHAUS  2,948,838
TUBULAR CAPACITOR
Filed June 13, 1956

INVENTOR.
VICTOR M. OBENHAUS
BY Roland A. Dexter
HIS ATTORNEY

2,948,838

TUBULAR CAPACITOR

Victor M. Obenhaus, North Adams, Mass., assignor to Sprague Electric Company, North Adams, Mass., a corporation of Massachusetts Filed June 13, 1956, Ser. No. 591,065

5 Claims. (Cl. 317—242)

The present invention relates to capacitors and particularly to capacitors that have reconstituted mica paper as an interelectrode spacer. This type of paper is described in U.S. Letters Patents 2,405,576, 2,490,129, 2,549,880, 2,612,889, 2,659,412, and 2,703,598.

Among the objects of the present invention is the provision of novel capacitors as well as capacitor-making methods that bring out more effectively some of the desirable features of the reconstituted mica paper.

The above, as well as additional objects of the present invention, will be more clearly understood from the following description of several of its exemplifications, reference being made to the accompanying drawings wherein.

According to the present invention, a very effective form of capacitor has electrodes separated from each other by reconstituted mica paper, the capacitor being impregnated with a silicone oil and having expansion bellows structure for accommodating the volume change of the silicone oil between temperatures from about —55° C. and +150° C. The silicone oil can contain from 0.5% to 5% by weight of a stabilizer selected from the class of azobenzenes and anthraquinones to inhibit the formation of gas under high potential stresses.

A very desirable form of construction for the above combination has an electrode and spacer assembly wound around a tubular dielectric support structure, a rigid dielectric tubular housing covering the assembly with its tubular axis parallel to that of the support structure, caps hermetically sealed onto each end of the housing, said caps being perforated at their central portions, and a pair of expansion bellows closely fitted internally of the support structure, each bellows having one end hermetically sealed around the central portion of a different cap, and having the other end sealed shut, the space around the bellows communicating with the space around the support structure, and both spaces being completely filled with the liquid impregnant. The housing and support structure are preferably borosilicate glass tubes, and the bellows made of metal with the electrode and spacer assembly divided into two axially spaced windings having a high temperature insulator ring inserted between them.

According to another phase of the present invention, a reconstituted mica paper capacitor is first wound on a core having an external diameter greater than ½ inch, then removed from the core, and then flattened so as to take up the space occupied by the core.

The capacitors of the present invention can also have reconstituted paper laminations bonded together and also bonded to electrode laminations, either in the form of wound or stacked constructions.

Figure 1:
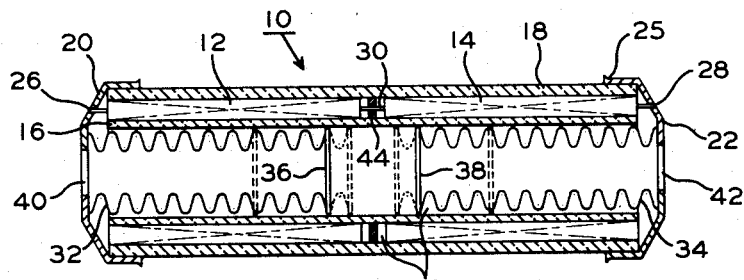
Fig. 1 is a sectional view of one type of capacitor embodying the present invention.

Referring now to the drawings, Fig. 1 shows a capacitor 10 having convolutely wound capacitance sections 12, 14, each made by winding up reconstituted mica paper and metal foil. The sections 12, 14, can be wound directly on a tubular core 16, or they can be wound on an arbor and then transferred from the arbor to the tube 16. Around the wound sections, another tube 18 is placed to provide an external housing. To the respective ends of tube 18 are hermetically sealed caps 20, 22.

The tube 18 is preferably of dielectric material such as glass, porcelain, resin, and the caps are conveniently sealed in place by providing the ends of the tube with metallized coating layers to which flanges 25 of the caps are soldered, as described in U.S. Patent No. 2,386,628, granted October 9, 1945, U.S. Patent No. 2,332,255, granted October 19, 1943 and U.S. patent application, Serial No. 531,952, filed September 1, 1955 (now abandoned). Making the caps of metal such as brass permits them to be readily soldered in place and also enables them to act as the terminal connectors for the capacitor 10.

Each section 12 and 14 has outwardly extending terminal leads 26, 28 respectively, and the sections are interconnected as by the load 30. The outwardly extending leads 26, 28 can be electrically connected to the respective caps as by making these leads longer than is needed and providing the caps with lead openings through which the extra lengths project. A drop of solder can then be used to solder the leads to their respective openings, and at the same time, seal the openings. The portions of the leads that extend beyond the openings can be cut off if they are not needed.

As shown in Fig. 1, capacitor 10 has each cap 20, 22 fitted with an expansible bellows 32, 34 positioned so as to extend toward each other within the tube 16. The bellows have their internal ends sealed by closure walls 36, 38, and their external ends are sealed in openings 40, 42 cut in the central portions of the respective caps. By this arrangement the spaces internally of the bellows are exposed to the ambient atmosphere, while the space 43 around these bellows is hermetically enclosed by housing 18. The portion of the latter space, that is within tube 16, is arranged to communicate with that portion of the space around tube 16, as by separating the ends of tube 16 from the end caps, or by cutting notches in these ends or elsewhere in this tube.

The two sections 12, 14 can be separated by a high temperature dielectric ring 44 of Teflon or mica for example, to reduce the possibility of breakdown between the opposing foils. This is helpful where the capacitor 10 is designed for operation at relatively high potentials of 5,000 volts or more. The ring 44 should not interfere with the connection provided by lead 30.

After the components are all assembled in the form shown in Fig. 1, the assembly is thoroughly impregnated with a silicone oil such as linear fully methylated decasiloxane. The oil fills the spaces 43 and also impregnates into the interstices of the reconstituted mica paper as well as any voids in the windings. A single impregnation, using a preliminary evacuation at a pressure of about 500 microns or less of mercury for 18 hours, and an impregnation temperature of 150° C. is sufficient. However, for best results, the initial evacuation can be maintained for 48 hours with the capacitors subjected to a temperature of 150° C. during this period. After evacuation, it is preferred to admit the oil slowly, keeping the pressure as low as possible, as for example down to 100 microns, since this more readily causes the oil to be degassed. A 45 minute filling period, where the impregnation takes place through small openings in the caps, is very effective. After the filling is completed, the unit can be brought up to atmospheric pressure as with dry nitrogen and the pressure even increased up to 20 pounds per square inch above atmospheric. The unit can then be again subjected to evacuation for 1 to 3 hours if desired. Following this, the openings are sealed up as by soldering the impregnation opening shut.

The bellows provide an expansible chamber in which the silicone oil can expand and contract as it is subjected to different temperatures. To make sure the bellows are not overstressed, the walls 36, 38 can be mechanically fixed in the desired locations at the time the impregnation openings are sealed shut. Threaded nuts can be soldered to the outer faces of these walls and engaged by a screw that is supported against the caps to provide the positioning.

As indicated in Fig. 1, the walls 36, 38 can be arranged to move between the dash-line limits over a temperature range of —55° C. to +150°. The minimum spacings between these walls should be about ¾ inch for high voltage operation. The field between these walls 36, 38 is not uniform, so that a substantial gap is required to provide a margin of safety. To lessen the total expansion of the bellows, it was found that a material could be placed in the chamber between the walls with success, provided it had a lower coefficient of expansion than the silicone impregnant, could withstand the temperature variations, and did not contaminate the impregnant oil. Also to maintain uniform distribution of the field, its dielectric constant should be substantially that of the oil. Such a material was polytetrafluoroethylene resin which produced higher arcing voltages with less separation than when not present.

The capacitor of Fig. 1 can be used over the entire temperature range given above, and with the caps at an operating potential of 20,000 volts. No corona discharge is apparent anywhere in any part of the range, but after a good many hours at 20,000 volts, traces of gas may appear, particularly at the upper end of the temperature range. The developement of gas in this way does not appear to shorten the life of the capacitors, and they have been used at 150° C. and 20,000 volts for over 2,000 hours afterwards without failure. The same results are obtained with other silicone oils such as ethyl polysiloxanes, methyl tolyl polysiloxanes, and ethyl phenyl polysiloxanes, whether completely linear, branched or cyclic. It is preferred that the silicone oil have a vapor pressure not more than about 10 mm. of mercury at the maximum operational temperature. A fully methylated polysiloxane having a viscosity of 200 centistokes at 25° C. is very effective. The preparation of suitable oils is shown in detail in the Patnode et al. article in the Journal of American Chemical Society, vol. 68, page 360 (1946), and in U.S. Patents 2,469,888 and 2,469,889; and 2,491,843.

It has also been discovered that the development of the gas can be delayed by adding to the silicone oil a stabilizer of the anthraquinone or azobenzene class, in an amount of 0.5 to 5% by weight. Azobenzene, azo-p-toluene, benzeneazo orthotoluene, azo-m-amylbenzene, azo-2-methyl-4-isopropyl benzene, azo-diphenyl, anthraquinone, $\beta$-tertiarybutyl anthraquinone, alpha-methyl-anthraquinone, 1,2,4-trimethyl anthraquinone and 1,2,7,8-tetraethyl anthraquinone and any hydrocarbon substituted azobenzene or anthraquinone seems to retard the generation of gas. The materials thus added to the dielectric must not degenerate its electrical character, particularly with respect to resistivity, corona starting voltage and power factor.

Figure 2:
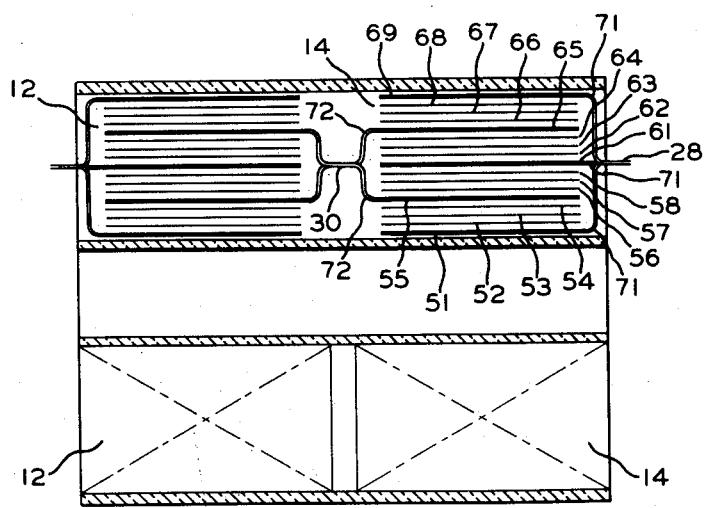
Fig. 2 is a schematic illustration of winding details that are used in the capacitor of Fig. 1; and, Fig. 3 is a pictorial view of a modified form of capacitor according to the present invention.

Fig. 2 illustrates in diagrammatic and somewhat distorted form one arrangement for winding the sections 12, 14 for use at high operation potentials. The sections are shown as "plate-wound" in the manner described in U.S. patent application, Serial No. 531,952, filed September 1, 1955 (now abandoned). In the upper portion of Fig. 2, only the electrode plates are shown, the dielectric being omitted in the interest of clarity.

The sections are "plate-wound" with a continuous length of reconstituted mica paper. This paper is wound on a winding arbor or core, and after a predetermined number of winding turns, an electrode plate which can be a length of 1 mil thick aluminum foil for example is applied between one turn of the paper and the next. After another predetermined number of turns of the paper, another electrode plate is similarly inserted. This is repeated until all the plates are in place.

As shown in Fig. 2, the innermost plate is a terminal electrode 51. The next three plates 52, 53 and 54 are floating electrodes. Following this is an oppositely polarized terminal electrode 55 and three more floating electrodes 56, 57 and 58. The winding is completed by another set of electrodes 61 through 68 which are duplicates of 51 through 58, and a final outermost plate 69. The floating electrodes 52, 53, 54, 56, 57 and 58 as well as the corersponding floating electrodes 62, 63, 64, 66, 67 and 68 are not conductively connected to anything. Electrodes 51, 61 and 69 are provided with extensions such as the conventional type of terminal tabs 71, that are brought out on one side of the winding and secured together as by soldering to make terminal lead 28. Alternatively they can be soldered to a separate wire lead.

On the other side of the winding are similarly brought out connections 72 which make the bridging lead 30. The other winding can be made in the same way, but it is turned around so that its connections are mirror images of those of the first winding. In this way, the inner and outer electrodes (51 and 69 in winding 14) are arranged to be at the same potential as the nearby terminal cap and bellows. Each electrode plate is preferably arranged to occupy no more than one revolution of the winding, the length of each plate being adjusted for this purpose, inasmuch as the outer turns are wound around a larger radius and are therefore longer.

A capacitor made as above indicated with two turns of reconstituted mica paper dielectric between successive electrode plates, where the turns are each of 1.5 mil thick reconstituted mica paper, operates very satisfactorily with the above dimethyl polysiloxane or any of the other silicone oil impregnants in a pulsing circuit that applies to the electrodes a peak pulse potential of 20,000 volts at temperatures of from —55° C. to +150° C. Where mineral oil is used as an impregnant, the minimum temperature should not be below about —25° C., but the hydrocarbon polymer of U.S. Patent No. 2,711,498, granted June 21, 1955 can also be used down to —55° C.

For heavy current carrying ability as in pulsing circuits, it is also advisable to have the lead extensions 71, 72 fairly well connected to their respective plates. When using lead extensions in the form of separate tabs, these tabs should be as long as possible. A length of at least ⅜ of an inch in the winding direction and a width that extends completely across the width of the electrode is preferred. Even then, the tabs are advisedly made of tinned copper, one mil thick, and spot-welded to the electrodes. A number of turns of dielectric can be wound before the inner and after the outer plates in order to provide a greater margin of safety, and the sides of the paper arranged to project beyond the plates a distance of 19/32 of an inch on either side. Since the mica paper is subject to cracking when bent around too sharp a radius, the winding mandrel should have a diameter of at least ½ inch. In the above construction, a winding mandrel 1¼ inches in diameter was used in order to make enough room for the bellows to provide the necessary expansion space.

Other winding arrangements can be used, as for example by omitting the second series of electrode plates from 62 through 69, or by using four or even five floating foils between the oppositely polarized electrodes of a winding. Fewer floating foils can also be used, but preferably where the operating voltages are lower. The use of a single wide winding extending from one cap to another is not as effective except at voltages of 2,000 or less, but more winding sections can be used if desired. In general, the reconstituted mica paper can be used very effectively at up to 1,000 volts per mil of thickness, even at the highest temperatures. Polytetrafluoroethylene resin when substituted for the reconstituted mica paper should not be used at more than about 600 volts per mil, particularly at the high temperatures. The margins of paper that project beyond the sides of the electrode plates can also be adjusted to different dimensions, depending upon the operating voltage. Margins as little as ¼ of an inch will be satisfactory at 1,000 volts or less per winding.

For the best results, particularly at high operating temperatures, the tubes 18 and 16 are preferably made of higher resistance materials such as borosilicate glass or glazed porcelain. Glass is somewhat sturdier in small wall thicknesses. Also, for high temperature use, particularly temperatures above 150° C., the metallized layer on the tube 18 should be made so as to withstand a soldering or welding temperature that is higher than the highest operating temperature. To this end, the connection of the caps to the tubular housing can be of the compressional type in which the cap or a terminal ring on the housing tube is mounted in place at a still higher temperature and arranged to have a greater thermal contraction than the tube, so that cooling of the assembly places the tube under considerable compression. With this type of cap connections, the reconstituted mica spacer-silicone coil combination can be used at temperatures as high as 250° C.

Ordinary soft or soda lime glass can be used for either or both of the tubes 16, 18, but at a relatively high temperature will show an appreciable leakage current. Alternatively, the core tubes may be made from mica paper bonded with silicone resin, glass fiber bonded with a thermoset resin as diallyl phthalate and similar structures with a volume saving as the walls can be thinner.

Figure 3:
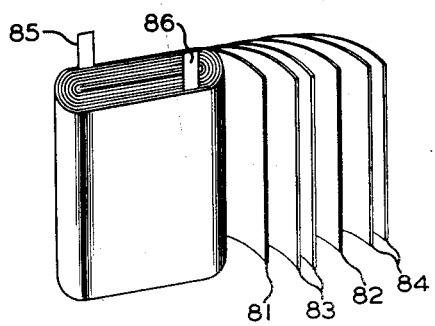

Fig. 3 shows an embodiment of the invention in which the reconstituted mica paper is used as a dielectric but which saves space. Although it has been found impractical to wind the mica paper dielectric on a mandrel having an outer diameter less than ½ an inch, it is a feature of the present invention that a capacitor, after winding around a large mandrel, can then be flattened without creating any problems by reason of the creasing of the reconstituted mica paper at the flattened folds.

The construction of Fig. 3 is originally wound around a mandrel 1 inch in outer diameter, using reconstituted mica paper layers 83, 84, each 1½ mils thick. The winding is commenced with at least three turns of the 1½ mils thick paper, after which electrode foils 81, 82 are inserted and carried through the remainder of the winding. The winding is then slipped off the mandrel and flattened by pressing in the conventional manner. Aging before pressing in an atmosphere having a relative humidity of about 40% or more produces a very good product. Although the first few turns of paper are usually badly cracked at the fold-over sites, the fourth and successive turns seem to be electrically sound, even though they show signs of some cracking. Upon tests under breakdown conditions, breakdown usually occurs at other locations.

In the construction of Fig. 3, tabs 85 and 86 are shown as provided for external connections. These tabs can merely be inserted in place, or where used under heavy current conditions, can be spot-welded as indicated in connection with Figs. 1 and 2.

For use at potentials of about 500 volts or more, the capacitor of Fig. 3 is preferably impregnated. Silicone oils, as in the constructions of Figs. 1 and 2, can be used, but silicone resins are also very effective. One very suitable silicone resin is a methyl polysiloxane prepared by hydrolyzing a silicon tetrachloride that has been methylated to a $CH_3$:Si mol ratio of 1:4, as described in U.S. Patent No. 2,258,218. This polymerization product is preferably used in an uncured or completely cured condition. After impregnation, the resin is cured by subjecting it to a temperature of 250° C. for at least seven hours. Lower temperatures and/or shorter times do not appear to be effective for a complete cure. As much as 96 curing hours can be used to advantage. Curing catalysts such as triethanolamine can be added to the uncured resin, but lower the electrical resistance of the dielectric somewhat.

Where the greatest possible capacitance is to be obtained from the winding, the flattened unit is preferably subjected to mechanical pressures to compact the layers as closely as possible. A pressure as high as 1,000 pounds per square inch is suitable for use.

Instead of using a pure resin as an impregnant, the impregnation can be carried out with a solution of the resin in a solvent such as toluene. Curing is then best preceded by a low temperature treatment to volatilize away the residual solvent.

When fully cured, the silicone resin acts to hold the layers of the winding together so that the capacitor will keep its compact, pressed shape, even though no pressure or clamp is used in the final assembly. When incompletely cured, the capacitor will show some drop in capacitance after heating to about 150° C., apparently because the layers will then tend to relax their compactness.

The resins described in Examples 2, 3, 5, 7, 8, 9 and 13 of U.S. Patent 2,661,348 and in Example 4 of U.S. Patent 2,652,385 are also suitable for use with the present invention. Other silicone resins that can be used in the construction of Fig. 3 are ethyl-phenyl-polysiloxanes, vinyl-toluyl-polysiloxanes, diphenyl polysiloxanes, etc., having between about 1.2 and 1.7 hydrocarbyl radicals per silicon atom, so as to provide for cross-linking.

Another high temperature bonding agent that can be used is an inorganic composition prepared from an aqueous mixture of boric acid, sodium hexametaphosphate and ammonia.

This mixture produces a clear solution that makes a good impregnant. After drying, it will leave a deposit that bonds the layers to each other very well at a fusion temperature of 650° C. The cured product resembles a glass and in fact shows power factor, leakage resistance, etc., like a glass dielectric. Similar inorganic binders, for example, phosphoric acid, can be used with success also.

Instead of bonding a flattened winding together, the above resins or inorganic bonding agents can be used in a stacked constructure to produce very satisfactory reconstituted mica paper stacked capacitors that require no clamping after the curing, and do not have to be varnished. In this embodiment the reconstituted mica paper (at least two layers) is first impregnated with the organic resin and partially cured. Thereafter the foils and partially cured silicone impregnated mica paper layers are laminated and subjected to further heat and pressure to yield a composite capacitor stack.

The electrode plates of Fig. 1 and Fig. 3 can be of widely varying thicknesses, depending upon the internal impedances that are desired. They can be foils as little as ¼ mil thick, or they can even be distilled films of metallization. Single thicknesses of the mica paper can be used as dielectric spacers, but it is preferred to use two of these thicknesses. The thicknesses themselves can vary from one mil to about 5 or 6 mils. The heavier thicknesses are more prone to damage by winding around a small radius and should be handled more carefully.

The capacitors of the present invention are particularly suited for pulse forming networks and jet engine ignition circuits or any other applications requiring high voltage operation over the specified temperature ranges.

Although copper or brass are satisfactory materials for the caps and the bellows at operating temperatures up to about 150° C., at higher temperatures, such as 250° C., it is preferable to use metals like nickel or Monel metal (30% copper, 1.4% iron, 1% manganese, the balance nickel) that are less subject to oxidation by atmospheric oxygen.

Instead of having the lead 30 brought around the inner margin of the spacer ring 44, the annular portion of the ring can be perforated to permit this lead to extend directly through it.

The inner tube 16 in applicant's construction of Figs. 1 and 2 is helpful in making sure that the bellows do not damage the innermost portion of the windings by rubbing across them as the bellows expand and contract. The windings can be entirely bonded, or only their inner ends can be bonded together as by the silicone resin or inorganic bonding agents described above, and the inner tube then omitted, although the maximum operational voltage will be lowered. When bonded together in this way, even direct rubbing contacts between the bellows and inner portions of the windings does no harm.

Obviously many modifications and variations of the present invention are possible in the light of the above teachings. It is, therefore, to be understood that within the scope of the appended claims, the invention may be practiced otherwise than as specifically described.

What is claimed is:

1. A capacitor comprising a generally tubular capacitance section having electrodes separated by reconstituted mica paper spacers and having a central bore completely therethrough, said section mounted within a substantially tubular housing having an open end, an expansion bellows with an open mouth mounted within said central bore with said open mouth sealed to said open end, said capacitance section and the space within said housing filled with a silicone oil, whereby said bellows accommodates the volume change of said silicone oil between temperatures of about −55° C. to +150° C.

2. The combination of claim 1 in which the silicone oil contains 0.5 to 5% of a stabilizer selected from the class of azobenzenes and anthraquinones.

3. A fixed capacitor having a plural electrode and spacer assembly wound around a tubular dielectric support structure, a rigid dielectric tubular housing covering the assembly with its tubular axis parallel to the axis of the support structure, caps hermetically sealed onto each end of the housing, said caps being perforated at their central portions, and a pair of expansion bellows closely fitted internally of the support structure, each bellows having one end hermetically sealed around the central portion of a different cap, and having the other end sealed shut, the space around the bellows communicating with the space around the support structure, and both spaces being completely filled with a liquid impregnant.

4. The combination of claim 3 in which the housing and the support structure are borosilicate glass tubes, the caps are metallic, each cap is connected to a different electrode, and the bellows are also metallic and axially spaced from each other.

5. The combination of claim 4 in which the spacer material is reconstituted mica paper, the assembly includes two axially spaced windings, each winding including at least one intermediate floating electrode, a Teflon ring is inserted between the windings, and the tubular support structure has an outside diameter larger than one-half inch.

References Cited in the file of this patent

UNITED STATES PATENTS

| | | |
|---|---|---|
| 1,731,884 | Belt | Oct. 15, 1929 |
| 2,619,443 | Robinson | Nov. 25, 1952 |
| 2,665,400 | Walker | Jan. 5, 1954 |

FOREIGN PATENTS

| | | |
|---|---|---|
| 484,271 | Great Britain | May 3, 1938 |
| 679,330 | Great Britain | Sept. 17, 1952 |

UNITED STATES PATENT OFFICE

CERTIFICATE OF CORRECTION

Patent No. 2,948,838                       August 9, 1960

Victor M. Obenhaus

It is hereby certified that error appears in the printed specification of the above numbered patent requiring correction and that the said Letters Patent should read as corrected below.

Column 2, line 25, for "load" read -- lead --; column 4, line 20, for "corersponding" read -- corresponding --; column 5, line 31, for "coil" read -- oil --; column 6, line 52, for "constructure" read -- construction --.

Signed and sealed this 31st day of January 1961.

(SEAL)
Attest:

KARL H. AXLINE
Attesting Officer

ROBERT C. WATSON
Commissioner of Patents